United States Patent
Iwanaga et al.

(10) Patent No.: US 10,282,427 B2
(45) Date of Patent: May 7, 2019

(54) METADATA STORING TECHNIQUE

(71) Applicant: International Business Machines Corporation, Armonk, NY (US)

(72) Inventors: Masayuki Iwanaga, Urayasu (JP); Yumiko Ohta, Yokohama (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 14/919,757

(22) Filed: Oct. 22, 2015

(65) Prior Publication Data

US 2016/0147479 A1 May 26, 2016

(30) Foreign Application Priority Data

Nov. 26, 2014 (JP) .................................. 2014-238920

(51) Int. Cl.
*G06F 17/30* (2006.01)

(52) U.S. Cl.
CPC .............................. *G06F 17/30094* (2013.01)

(58) Field of Classification Search
CPC combination set(s) only.
See application file for complete search history.

(56) References Cited

U.S. PATENT DOCUMENTS

| | | | |
|---|---|---|---|
| 6,876,579 B2 | 4/2005 | Liang et al. | |
| 9,646,033 B2 | 5/2017 | Gensler, Jr. et al. | |
| 2004/0181508 A1* | 9/2004 | Fujihara | G06F 17/30955 |
| 2011/0219184 A1* | 9/2011 | Jaquette | G11B 27/002 |
| | | | 711/111 |
| 2011/0238906 A1* | 9/2011 | Amir | G11B 27/002 |
| | | | 711/111 |
| 2012/0127606 A1 | 5/2012 | Starr | |
| 2016/0062671 A1 | 3/2016 | Iwasaki et al. | |

FOREIGN PATENT DOCUMENTS

| | | |
|---|---|---|
| JP | 05342073 A | 12/1993 |
| JP | 2000148340 A | 5/2000 |
| JP | 2002033765 A | 1/2002 |
| JP | 2004171396 A | 6/2004 |

(Continued)

OTHER PUBLICATIONS

Japanese Application No. 2014-238920, filed Nov. 26, 2014, entitled: "Metadata Writing Method, Metadata Reading Method, File Management System, Computer System, Program Product, and Data Structure", pp. 1-55.

*Primary Examiner* — Etienne P Leroux
(74) *Attorney, Agent, or Firm* — Michael A. Petrocelli (57) ABSTRACT

A computer-implemented metadata processing method and a system includes writing metadata to or reading metadata from a storage medium in which an index that contains metadata of each of one or more pieces of data is stored. The method and system include determining, in response to a processing request, which includes a write request or a read request, when to communicate with a storage area outside the index. At least a portion of content of the metadata relating to the processing request is processed, and accessed, including storing or obtaining, in the index, location information indicating the storage area of the portion of content of the metadata.

16 Claims, 9 Drawing Sheets

(56) References Cited

FOREIGN PATENT DOCUMENTS

| | | |
|---|---|---|
| JP | 2008009699 A | 1/2008 |
| JP | 2009064178 A | 3/2009 |
| JP | 2012065087 A | 3/2012 |
| JP | 2013191259 A | 9/2013 |
| JP | 6095012 B2 | 2/2017 |
| WO | 2013054597 A1 | 4/2013 |

* cited by examiner

```xml
<file>
    <name>w</name>
    <length>7</length>
    <readonly>false</readonly>
    <creationtime>20xx-03-05T08:08:48.xxxxxxxxxZ</creationtime>
    <changetime>20xx-08-01T05:27:00.xxxxxxxxxZ</changetime>
    <modifytime>20xx-08-01T05:27:00.xxxxxxxxxZ</modifytime>
    <accesstime>20xx-08-01T05:27:00.xxxxxxxxxZ</accesstime>
    <backuptime>20xx-08-01T05:27:00.xxxxxxxxxZ</backuptime>
    <fileuid>15</fileuid>
    <extendedattributes>
        <xarrt>
            <key>user.meta</key>
            <value>100</value>
        </xarrt>
        <out_of_index_metadata>
            <metadata1>
                <key>big.meta</key>
                <partition>b</partition>
                <startblock>100</startblock>
                <byteoffset>0</byteoffset>
                <bytecount>200</bytecount>
            </metadata1>
            <metadata2>
                ...
            </metadata2>
            ...
            <metadataN>
                ...
            </metadataN>
        </out_of_index_metadata>
    </extendedattributes>
    <extentinfo>
        <extent>
            <fileoffset>0</fileoffset>
            <partition>b</partition>
            <startblock>35</startblock>
            <byteoffset>0</byteoffset>
            <bytecount>7</bytecount>
        </extent>
    </extentinfo>
</file>
```

METADATA STORING TECHNIQUE

BACKGROUND

The present invention relates to a scheme for storing metadata in a storage medium, and more specifically, it relates to a metadata writing method, a metadata reading method, a file management system, a computer system, and a program product used to store metadata in a storage medium.

A data format and software implementation called an LTFS (Linear Tape File System) format and LTFS software which enable access to a tape medium via an interface of a typical file system are known. The LTFS format is an open specification, and file systems that support tape media to which writing is performed in accordance with the LTFS format are implemented by multiple vendors including International Business Machines Corporation® (IBM® (registered trademark)), Oracle®, and Hewlett Packard®. By using the LTFS, an application that uses hard disk drives or flash memory can access tape media without modification.

In the LTFS format, a tape medium divided into two partitions called an index partition and a data partition is used (see Japanese Patent Application Publication No. 2012-65087, for example). The most recent index is written to the index partition, and content data of files and multiple versions of the index (histories of the index) including the most recent index are written to the data partition. The index contains pointers to content data of the files in the data partition and contains file attribute information, such as file names. Content data in the data partition is not accessible without the index, and therefore, the index is written to the tape medium on a regular or irregular basis.

It is known that the capacity of the index is typically about 1 KB per file (that is, about 1 GB for 1 million files). However, this is a typical example, and the capacity of the index may vary depending on the actual capacity of metadata. For example, a fork, such as an ADS (Alternate Data Stream) or a resource fork, may have any capacity, and therefore, may have a capacity comparable to that of the file content. In a case where a file that has metadata, such as a fork, is used, the size of the index may increase.

Accordingly, as the size of the index increases, writing of the index takes longer, and a situation may arise where the index is unable to fit in an index partition of a certain size. As described above, multiple versions of the index are cumulatively written to the data partition, and therefore, an increase in the size of the index may result in a shortage of available resources of the tape medium.

SUMMARY

The development of a technique for preventing a shortage of available resources of a tape medium by devising a better way of storing large-capacity metadata described above is desirable.

The present invention is in view of shortcomings in the related art described above, and an object thereof is to provide a metadata writing method, a metadata reading method, a file management system, a computer system, a program product, and a data structure with which, in a storage medium that stores an index which contains metadata of each of one or more pieces of data. Thereby, it is possible to prevent the index from becoming excessively large and to store metadata without consuming more resources.

In one embodiment of the present invention, a computer-implemented metadata processing method includes writing metadata to or reading metadata from a storage medium in which an index that contains metadata of each of one or more pieces of data is stored. The method comprising: determining using a computer, in response to a processing request, which includes a write request or a read request, when to communicate with a storage area outside the index; processing at least a portion of content of the metadata relating to the processing request to or from the storage area outside the index; and accessing, including storing or obtaining, in the index, location information indicating the storage area of the portion of content of the metadata.

In another embodiment of the present invention, a file management system performs, on a computer system, file management for a storage medium in which an index that contains metadata of each of one or more pieces of data is stored. The file management system comprising: a storage determination unit that determines, in response to a processing request, which includes a write request or a read request, when to communicate with a storage area outside the index; a processing unit, including a writing unit or an obtaining unit, that processes at least a portion of content of the metadata relating to the processing request to or from the storage area outside the index; and an accessing unit, including a storing unit or a reading unit, that stores or reads, in the index, location information indicating the storage area of the portion of content of the metadata.

In another embodiment of the present invention, a computer system comprises: a processor; a memory with which the processor communicates; and an interface device used to make a connection with a storage medium driving device that drives a storage medium in which an index that contains metadata of each of one or more pieces of data is stored. The processor is configured to: determine, in response to a processing request, which includes a write request or a read request, when to communicate with a storage area outside the index; process at least a portion of content of the metadata relating to the processing request to or from the storage area outside the index; and access, including storing or obtaining, in the index, location information indicating the storage area of the portion of content of the metadata.

DETAILED DESCRIPTION

Hereinafter, an embodiment of the present invention will be described; however, embodiments of the present invention are not limited to the embodiment described below. Note that, in the embodiment described below, as a metadata writing method, a metadata reading method, and a file management system, a metadata writing method and a metadata reading method performed in a tape file management system that performs file management of a tape medium, and the tape file management system will be described respectively, for example.

Figure 1:
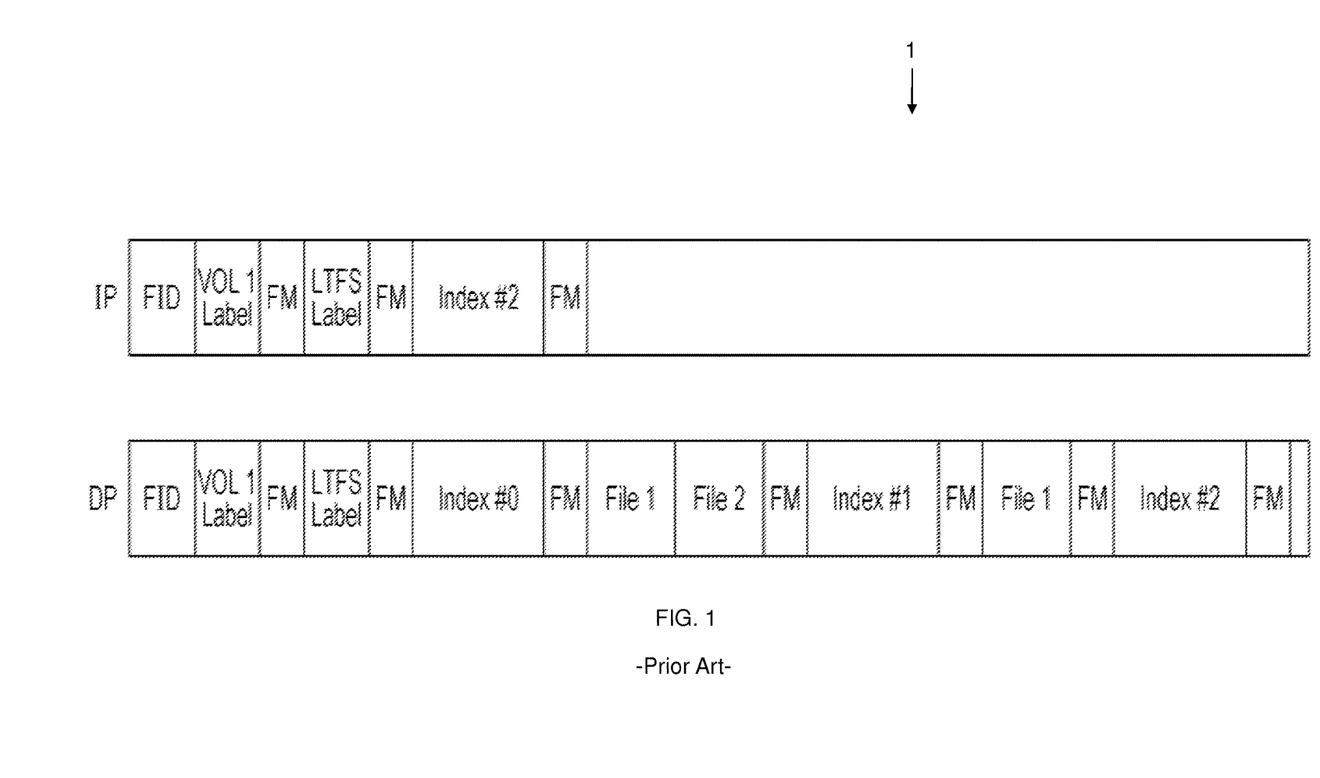
FIG. 1 is a diagram illustrating a volume layout of a tape medium used in a tape file system according to the related art.

FIG. 1 is a diagram illustrating a volume layout of a tape medium 1 used in a tape file system according to the related art. Note that FIG. 1 illustrates a layout based on the LTFS format supported by LTO5 and later standards, for example. In an LTFS file system, a tape medium needs to be initialized in advance to the LTFS format before writing files to and reading files from the tape medium. As a result of initialization, the tape medium is logically divided into two types of partitions called an index partition (hereinafter referred to as an IP) and a data partition (hereinafter referred to as a DP) before use.

In the volume layout illustrated in FIG. 1, in the "FID" record, the same information as written to the cartridge memory of a tape cartridge, which is a tape medium, is recorded. "FM" represents a file mark that is written in order to delimit files. In the "VOL 1 Label" record, a label identifier, a label number, a volume identifier, and other information are stored. The "LTFS Label" record has an XML (eXtensible Markup Language) data structure and stores information about the LTFS volume and the LTFS partitions.

FIG. 1 illustrates a state where two files ("File 1" and "File 2") are written to the tape medium. The most recent index ("Index #2" in FIG. 1) is written to the IP, and content data of the files ("File 1" and "File 2" in FIG. 1) and multiple versions of the index including the most recent index ("Index #0" to "Index #2" in FIG. 1) are written to the DP.

In the LTFS format, an index that contains metadata of a file, directory, or symbolic link, such as the directory structure of the file, information about the logical location on the tape to which the file is written, the name of the file, and so on, is contained as an index file in an XML format.

In the LTFS format, it is not possible to determine where content data of a file exists without having metadata (logical location information) of the file in the index file. That is, if data of a file is written to a tape medium, but the index file is not written to the tape medium before the system shuts down, the file is unable to be read from the tape medium at a later time. Accordingly, the LTFS provides, from the viewpoint of protecting a written file, a setting for writing the index file to the tape medium at regular intervals, a setting for writing the index file to the tape medium each time a file is closed, and so on.

On the other hand, frequent writing of the index to a tape medium results in a shortage of available resources of the tape medium. It is known that the capacity of the index is typically about 1 KB per file, and therefore, about 1 GB for 1 million files, for example. If the capacity of the index is of this size, frequent writing of the index does not become a serious problem. However, in particular, in a case where a file is used that has metadata such as a fork (ADS or resource fork), the metadata having a capacity comparable to the file size or, in some cases, a capacity larger than that of the content data, an increase in the size of the index may cause the following problems. An increase in the size of the index increases the time taken to write the index and may lead to a situation where the index is unable to fit in the IP. Furthermore, an increase in the size of the index may cause a shortage of available resources due to cumulative storage of multiple versions of the index in the DP.

A tape file management system according to the embodiment of the present invention employs a configuration in which, in response to a write request for writing certain metadata of certain data (metadata can be attached to a file, directory, and symbolic link), it is determined whether the capacity of the metadata relating to the write request meets a criterion of outside-index storage. In a case where the metadata is a fork or the like described above, has a large capacity, and is determined to meet the criterion of outside-index storage, content data of the metadata relating to the write request is written to a storage area in the DP outside the areas for the index, and logical location information that indicates the storage area in the DP to which the content data of the metadata relating to the write request is written is stored in the index. This configuration prevents the index from becoming excessively large, avoids a shortage of available resources due to cumulative storage of multiple versions of the index described above, and attains efficient storage of metadata.

Now, a metadata management function implemented in the tape file management system according to the embodiment of the present invention will be described with reference to FIG. 2 to FIG. 9.

Figure 2A:
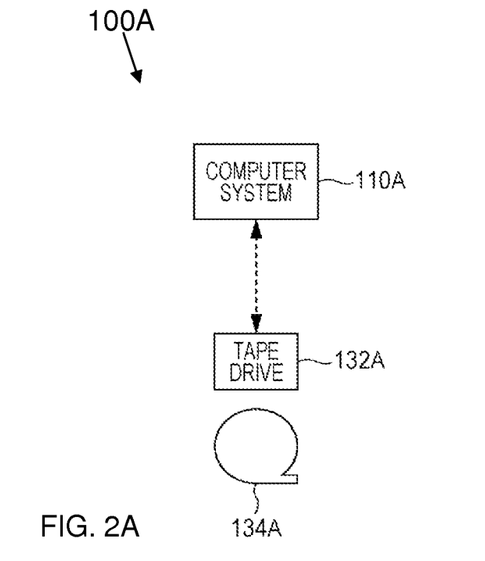
FIGS. 2A and 2B include diagrams illustrating system configurations of a tape file management system according to an embodiment of the present invention.
Figure 2B:
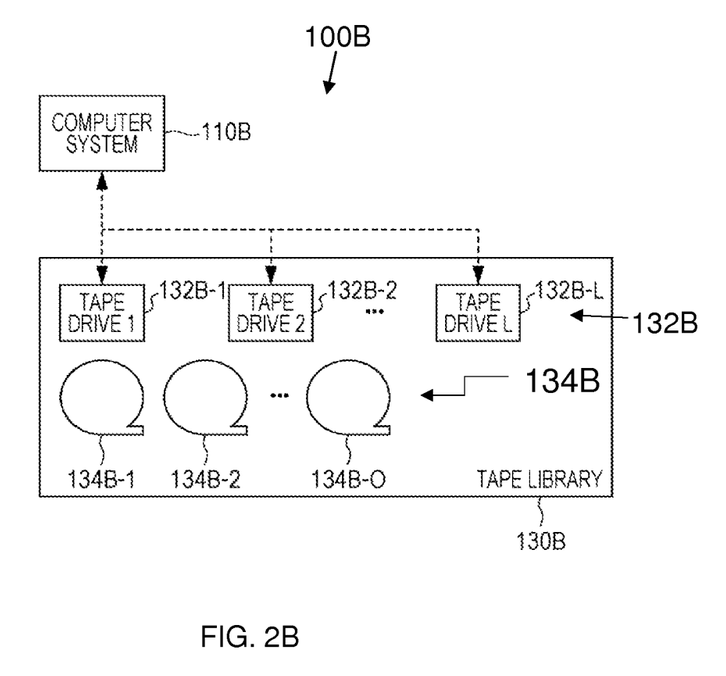

FIGS. 2A and 2B include diagrams illustrating system configurations of the tape file management system (specifically, a tape file management system 100A and a tape file management system 100B) according to the embodiment of the present invention. FIG. 2A illustrates the tape file management system 100A using a single tape drive. On the other hand, FIG. 2B illustrates the tape file management system 100B using a tape library constituted by one or more tape drives.

The tape file management system 100A illustrated in FIG. 2A includes a computer system 110A (hereinafter sometimes referred to as a computer system 110) and a single tape drive 132A (hereinafter sometimes referred to as a tape drive). To the tape drive 132A, a tape medium 134A (hereinafter sometimes referred to as a tape medium 134), such as a tape cartridge, is loaded. The computer system 110A accesses the loaded tape medium 134A via the tape drive 132A. The tape drive 132A constitutes a storage medium driving device in the form illustrated in FIG. 2A.

Figure 4:
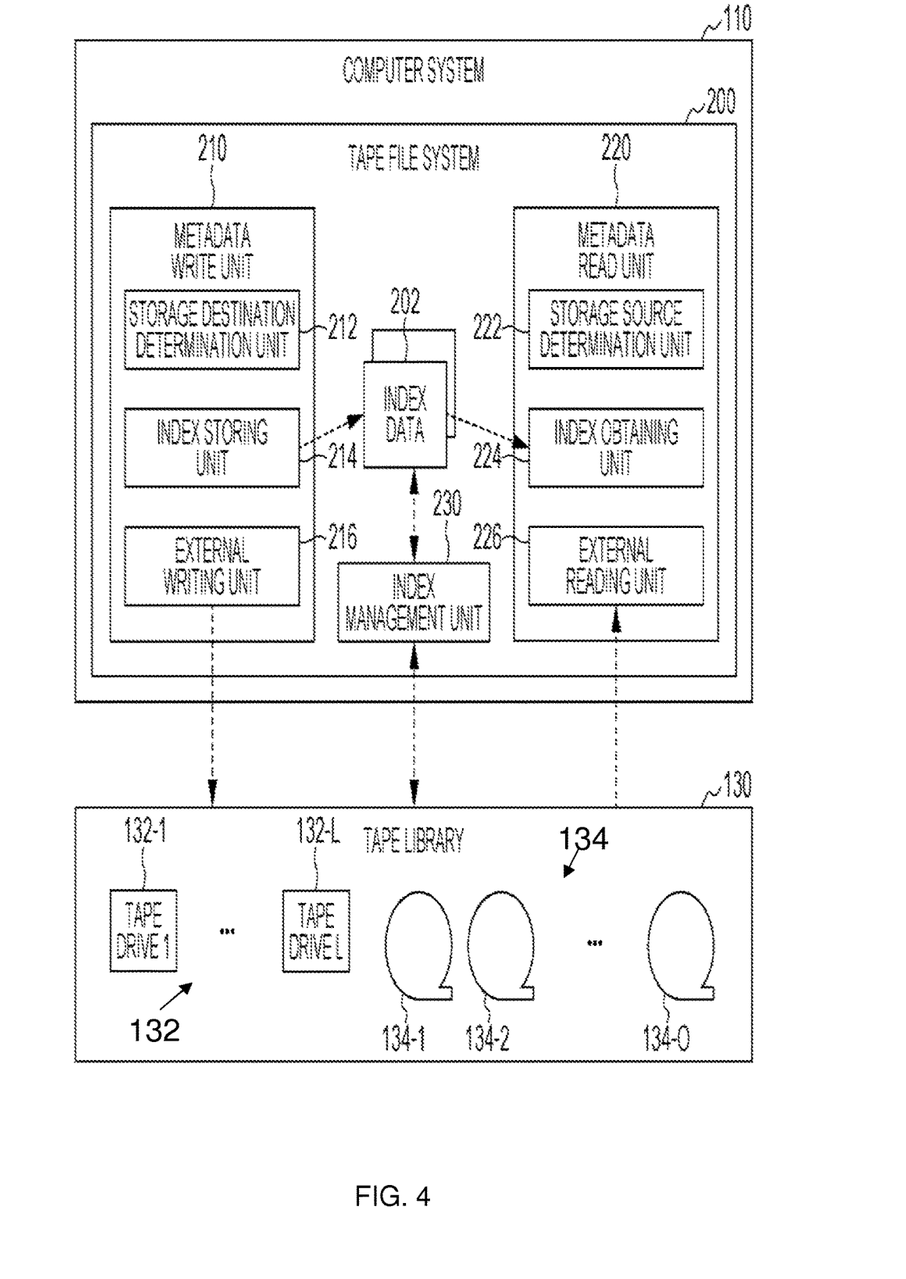
FIG. 4 is a diagram illustrating a software configuration of the tape file management system according to the embodiment of the present invention.

The tape file management system 100B illustrated in FIG. 2B includes a computer system 110B (hereinafter sometimes referred to as the computer system) and a tape library 130B (hereinafter sometimes referred to as a tape library 130 as shown in FIG. 4). The tape library 130B includes one or more tape drives 132B-1, 132B-2, to 132B-L (hereinafter collectively referred to as tape drives 132B, or referred to generically as tape drives 132 as shown in FIG. 4) and performs library management of one or more tape media 134B-1, 134B-2, to 134B-O (hereinafter collectively referred to as tape media 134B, or referred to as the tape medium 134 or tape media 134 as shown in FIG. 4) that are taken in. A desired tape medium 134B is selected from among the one or more tape media 134B in the tape library 130B by using a robot mechanism and is loaded to the tape drive 132B. The computer system 110B accesses the tape medium 134B via the tape drive 132B. The tape drive 132B constitutes a storage medium driving device in the form illustrated in FIG. 2B.

Although the tape file management system in two forms is illustrated in FIGS. 2A and 2B, a metadata writing function and a metadata reading function, which will be described in detail below, according to the embodiment of the present invention can be implemented in either of the two forms or in other forms. The system configuration illustrated in FIG. 2A corresponds to LTFS software provided by IBM® (registered trademark) Corporation as LTFS SDE (LTFS Single Drive Edition). The system configuration illustrated in FIG. 2B corresponds to LTFS software provided by IBM® (registered trademark) Corporation as LTFS LE (LTFS Library Edition).

Although detailed description will be omitted, the metadata writing function and the metadata reading function according to the embodiment of the present invention can be included in LTFS software, such as LTFS EE (Enterprise Edition) provided by IBM® (registered trademark) Corporation, which collaborates with a distributed and shared file system, such as GPFS, on a computer system that includes one or more computers.

Figure 3:
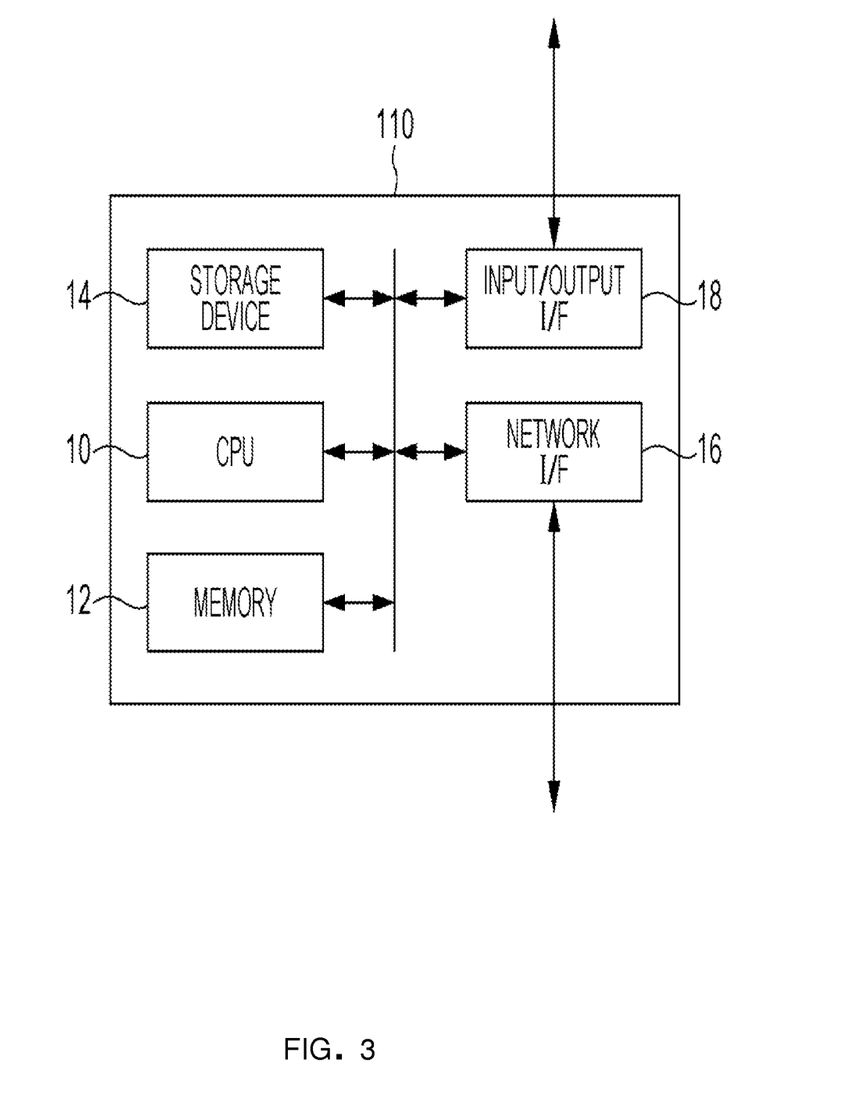
FIG. 3 is a diagram illustrating a hardware configuration of a computer system that constitutes the tape file management system according to the embodiment of the present invention.

FIG. 3 is a diagram illustrating a hardware configuration of the computer system 110 that constitutes the tape file management system according to the embodiment of the present invention. As illustrated in FIG. 3, the computer system 110 includes a CPU (central processing unit) 10, which is a processor, a memory 12, such as an SDRAM (synchronous dynamic random access memory), a storage device 14, such as a ROM (read-only memory), an HDD (hard disk drive), or a flash memory, a network interface device 16, and an input/output interface device 18.

The network interface device 16 is constituted as a network adapter, such as an NIC (network interface card) and connects the computer system 110 to a network, such as a LAN (local area network). The input/output interface device 18 is constituted as a network adapter, such as an NIC, an HBA (host bus adapter), such as an FC HBA, or the like, and connects the computer system 110 to the tape drive 132 or to the tape library 130.

The computer system 110 implements functions and processes described below by reading various programs stored in the storage device 14 and loading the programs to the memory 12 under control of the CPU 10. The hardware configurations of the tape drive 132 and the tape library 130 are not illustrated; however, the tape drive 132 and the tape library 130 can each be constituted by including a CPU, a memory, a ROM, a network interface, an input/output interface, a tape driving mechanism, and other appropriate hardware devices.

FIG. 4 is a diagram illustrating a software configuration of the tape file management system according to the embodiment of the present invention. The computer system 110 illustrated in FIG. 4 includes a tape file system 200 as a software configuration. Note that the configuration illustrated in FIG. 4 corresponds to the form illustrated in FIG. 2B in which the tape library 130B is used. A software configuration similar to that illustrated in FIG. 4 may be employed in the form illustrated in FIG. 2A in which the single tape drive 132A is used.

The tape file system 200 is able to mount the tape media 134 while assuming the tape library 130 as one file system.

The tape medium 134 in the tape library 130 is typically accessed as a subdirectory in the tape library 130. The tape media 134 includes multiple tapes 134-1, 134-2, continuing to tape 134-O. The tape file system 200 operates on the computer system 110 that is connected to the tape drives 132, and accesses recording areas on the tape media 134 via an LTFS file system interface. The tape drives 132 include multiple tape drives 132-1, 132-2, continuing to tape drive 132-O.

Note that, in the form illustrated in FIG. 2A in which the single tape drive 132A is used, the tape file system 200 mounts the tape medium 134 as one file system. The tape file system 200 similarly operates on the computer system 110 that is connected to the tape drive 132, and accesses a recording area on the tape medium 134 via an LTFS file system interface.

The tape file system 200 includes a metadata write unit 210 that accepts and processes a write request for writing metadata and a metadata read unit 220 that accepts and processes a read request for reading metadata as modules for managing read/write of metadata according to the embodiment of the present invention. A write request is made by an application in a case where certain metadata of certain data, such as a certain file, directory, or symbolic link, is newly created or in a case where certain metadata of certain data is updated, for example. A read request is made by an application in a case where certain metadata of certain data is to be referred to, for example.

The tape file system 200 may further include an index management unit 230. The index management unit 230 is a module that maintains and manages the index of the mounted tape medium 134 in the memory 12. When the tape medium 134 is mounted in the tape library 130, the index management unit 230 reads the most recent index file from the mounted tape medium 134, and loads the most recent index file to the memory 12 as index data 202, as needed. The index management unit 230 writes the most recent index file to the mounted tape medium 134 on the basis of the index data 202 in the memory 12 when the mounted tape medium 134 is to be unmounted from the tape library 130, when a file is closed, or on a regular basis.

The metadata write unit 210 includes a storage destination determination unit 212, an index storing unit 214, and an external writing unit 216.

The storage destination determination unit 212 determines, in response to a write request for writing certain metadata of certain data (a certain file, for example, the same applies hereinafter), whether the capacity of the metadata relating to the write request meets a criterion of outside-index storage (hereinafter sometimes referred to as an external storage criterion). The external storage criterion may be defined as a threshold (4 KB or more, for example) of the capacity of metadata, for example.

If it is determined that the external storage criterion is met, the external writing unit 216 writes content data of the metadata relating to the write request to a storage area in the DP of the tape medium 134 outside the areas for the index. If it is determined that the external storage criterion is met, the index storing unit 214 stores logical location information that indicates the storage area in the DP to which the content data of the metadata is written, in the index as the certain metadata of the certain data. In this case, the logical location information is temporarily stored in the index data 202 in the memory 12, and the most recent index file is written to the tape medium 134 later at an appropriate time. If it is determined that the external storage criterion is not met, the index storing unit 214 stores the content data of the metadata in the index as the certain metadata of the certain data.

When writing of the metadata relating to the write request is completed, the metadata write unit 210 notifies the request source, namely, an application, for example, of completion of writing of the metadata. The storage destination determination unit 212, the index storing unit 214, and the external writing unit 216 respectively constitute a storage destination determination unit, a storing unit, and a writing unit in the embodiment.

The metadata read unit 220 includes a storage source determination unit 222, an index obtaining unit 224, and an external reading unit 226.

The storage source determination unit 222 determines, in response to a read request for reading certain metadata of certain data (for example, a certain file, the same applies hereinafter), whether the metadata relating to the read request is stored outside the index. If content data of the metadata relating to the read request is not present in the index, and logical location information is stored in the index, it is determined that the metadata is stored outside the index.

If it is determined that the metadata is not stored outside the index, the index obtaining unit 224 obtains the content data of the metadata relating to the read request from the index. If it is determined that the metadata is stored outside the index, the index obtaining unit 224 obtains, from the index, logical location information that indicates a storage area in the DP outside the areas for the index. In this case, the logical location information is obtained from the index data 202 that is loaded to the memory 12 when the tape medium 134 is mounted, as the certain metadata of the certain data. If it is determined that the metadata is stored outside the index, the external reading unit 226 reads the content data of the metadata relating to the read request from a storage area identified by using the obtained logical location information.

When the content data of the metadata relating to the read request is obtained, the metadata read unit 220 passes the obtained metadata to the request source, namely, an application, for example. The storage source determination unit 222, the index obtaining unit 224, and the external reading unit 226 respectively constitute a storage source determination unit, an obtaining unit, and a reading unit in the embodiment.

Note that, in the description given above, in a case of outside-index storage, among content data of metadata and logical location information about the metadata, only the logical location information is contained in the index, and the entire content data of the metadata relating to a write request is written to a storage area in the DP outside the areas for the index. However, embodiments of the present invention are not limited to this embodiment. In another embodiment, a portion of content data of metadata relating to a write request may be contained in the index, and the remaining portion of the content data of the metadata may be written to a storage area in the DP outside the areas for the index. In this case, when a read request for reading the metadata is made, a portion of the content data of the metadata relating to the read request is obtained from the index, and the remaining portion of the content data of the metadata is obtained from the storage area in the DP outside the areas for the index in response to the read request.

Figure 5:
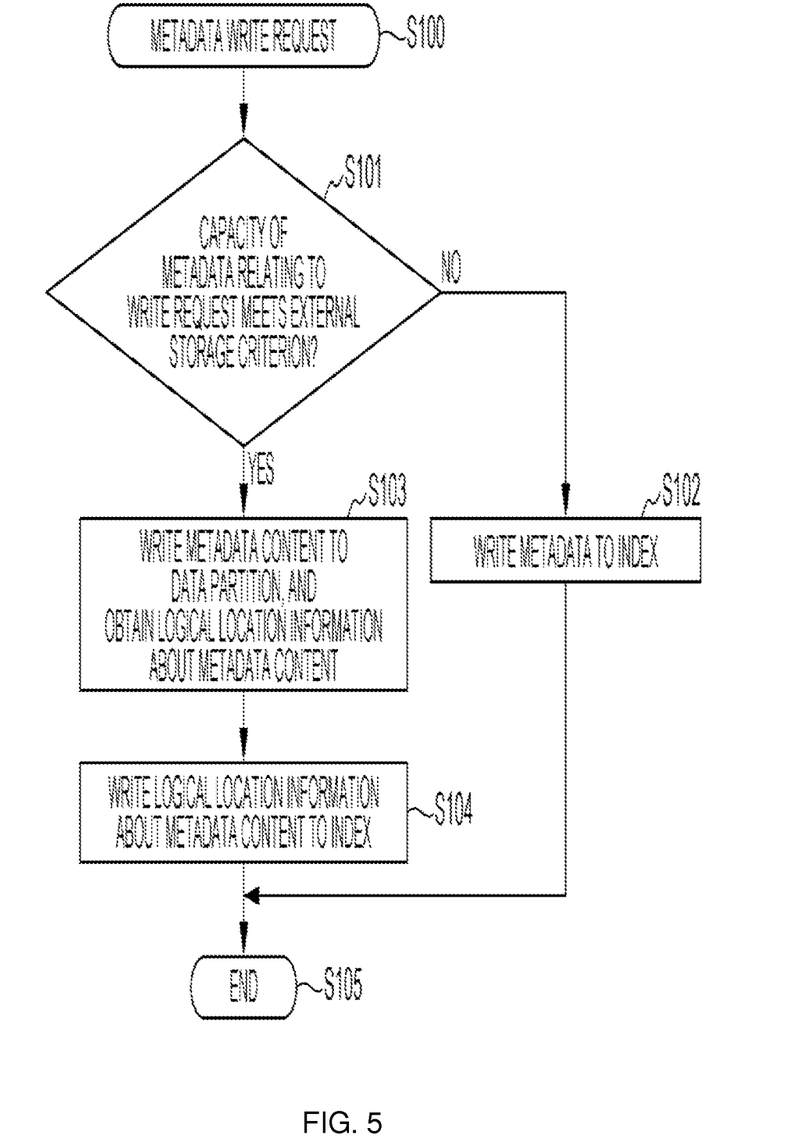
FIG. 5 is a flowchart illustrating a metadata writing method performed by the computer system according to the embodiment of the present invention.

Now, the metadata writing method according to the embodiment of the present invention is described in detail below with reference to a flowchart illustrated in FIG. 5 and a data structure illustrated in FIG. 6. FIG. 5 is a flowchart illustrating the metadata writing method performed by the computer system 110 according to the embodiment of the present invention.

The process illustrated in FIG. 5 starts from step S100 in response to a write request for writing certain metadata that is made by an application, for example, to the tape file system 200. In step S101, the storage destination determination unit 212 of the computer system 110 determines whether the capacity of the metadata relating to the write request meets an external storage criterion. If the metadata relating to the write request is a fork or the like that has a certain length, and the capacity of the content of the metadata exceeds a predetermined threshold, for example, it is determined that the external storage criterion is met.

If it is determined in step S101 that the external storage criterion is not met (No in step S101), the process proceeds to step S102. In step S102, the index storing unit 214 of the computer system 110 writes the metadata relating to the write request to the index (the index data 202 in the memory 12) as usual, and the process ends at step S105.

On the other hand, if it is determined in step S101 that the external storage criterion is met (Yes in step S101), the process proceeds to step S103. In step S103, the external writing unit 216 of the computer system 110 writes content data of the metadata to the DP of the tape medium 134 outside the areas for the index as in a case of the file content data, and obtains logical location information about the content data.

Specifically, in step S103, the computer system 110 instructs the tape drive 132 to write the content data of the metadata to the DP of the tape medium 134. The computer system 110 thereafter obtains, as a response to the instruction, logical location information that indicates a storage area to which the content data of the metadata is written.

In step S104, the index storing unit 214 of the computer system 110 writes the logical location information that indicates the storage area to which the content data of the metadata relating to the write request is written, to the index (the index data 202 in the memory 12), and the process ends at step S105.

Figure 6:
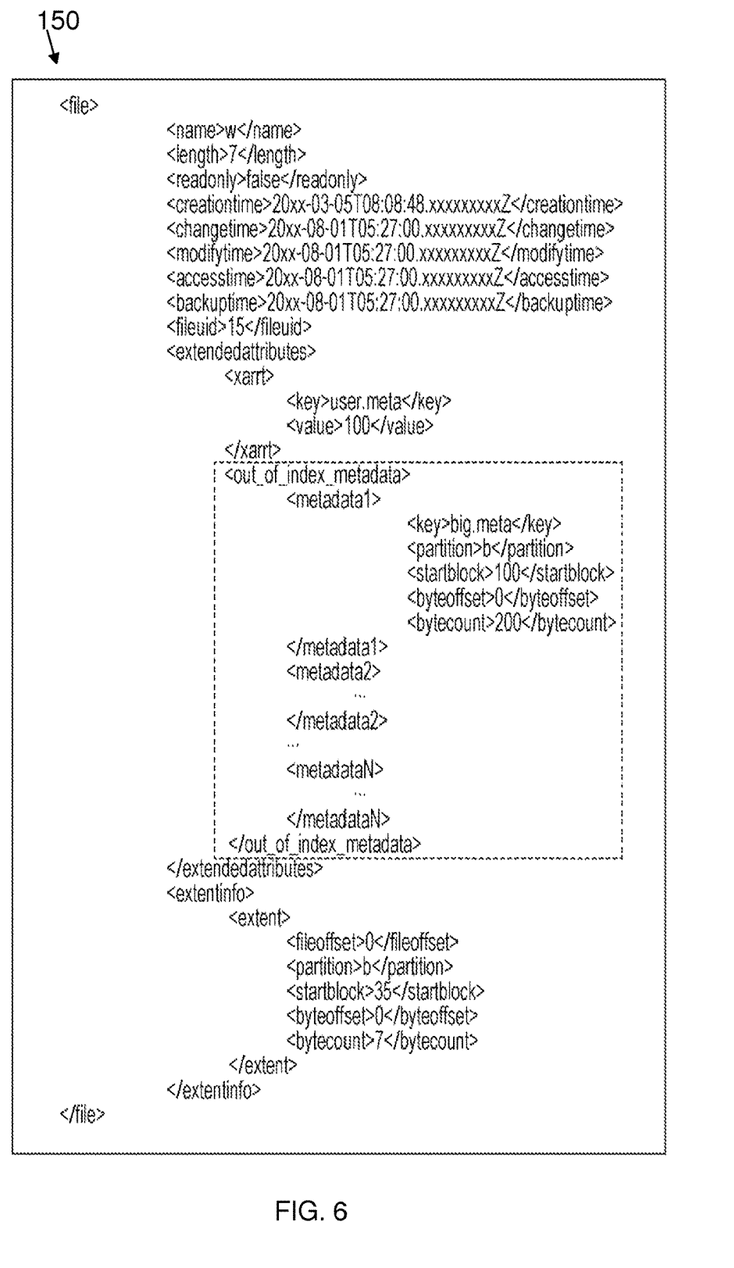
FIG. 6 is a diagram illustrating an example of a data structure of an index file that is created in accordance with the metadata writing method illustrated in FIG. 5.

FIG. 6 is a diagram illustrating an example of a data structure of an index file 150 that is created in accordance with the metadata writing method illustrated in FIG. 5. Note that FIG. 6 illustrates an example of an index file in an XML format which is generated on the basis of the index data 202 in the memory 12 and which is stored in the IP of the tape medium 134.

As illustrated in FIG. 6, an index includes one or more pieces of metadata, each of which is sandwiched between a start tag (<name> tag, for example) and an end tag (</name> tag, for example). In FIG. 6, the portion surrounded by a dashed line is a portion in which, for metadata that meets an external storage criterion, logical location information that indicates a storage location of content data of the metadata is included. In the example illustrated in FIG. 6, in a portion between an <out_of_index_metadata> tag and a </out_of_index_metadata> tag, metadata that includes logical location information about each of one or more pieces of metadata which meet an external storage criterion is included.

In the example illustrated in FIG. 6, key information between a <key> tag and a </key> tag, partition information between a <partition> tag and a </partition> tag, start block information between a <startblock> tag and a </startblock> tag, offset information between a <byteoffset> tag and a </byteoffset> tag, and count information between a <bytecount> tag and a </bytecount> tag are included as logical location information. If metadata is not divided, count information indicates the data size. Metadata may be divided and stored. If metadata is divided, a plurality of pieces of start block information, a plurality of pieces of offset information, and a plurality of pieces of count information are written, and each piece of count information indicates the number of bytes of the corresponding divided data that is written to a storage area starting from the corresponding offset of the corresponding start block.

Regarding other metadata (file attributes, such as the length between a <length> tag and a </length> tag), the content of the metadata instead of logical location information is stored.

As illustrated in FIG. 6, an index file created in accordance with the metadata writing method according to the embodiment of the present invention contains logical location information that indicates a storage location in the DP to which content data of metadata having a capacity that meets an external storage criterion is written.

Figure 7:
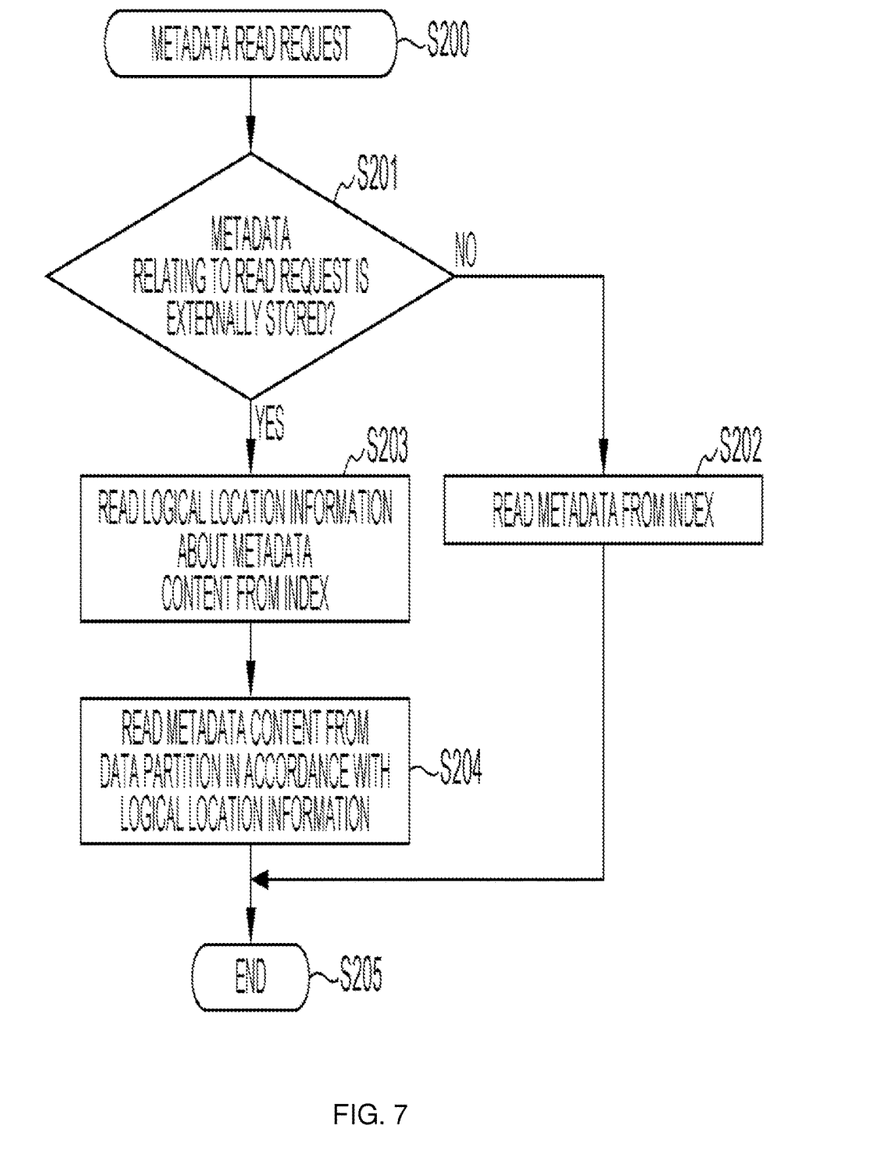
FIG. 7 is a flowchart illustrating a metadata reading method performed by the computer system according to the embodiment of the present invention.

Now, the metadata reading method according to the embodiment of the present invention is described in detail below with reference to a flowchart illustrated in FIG. 7 and the data structure illustrated in FIG. 6. FIG. 7 is a flowchart illustrating the metadata reading method performed by the computer system 110 according to the embodiment of the present invention.

The process illustrated in FIG. 7 starts from step S200 in response to a read request for reading certain metadata that is made by an application, for example, to the tape file system 200. In step S201, the storage source determination unit 222 of the computer system 110 determines whether the metadata relating to the read request is externally stored.

For example, in a case of metadata like a file name between the <name> tag and the </name> tag illustrated in FIG. 6, the content of the metadata is present therebetween, and therefore, the metadata is determined to not be externally stored. On the other hand, regarding metadata that is present in the portion between the <out_of_index_metadata> tag and the </out_of_index_metadata> tag (metadata in a portion between a <metadata1> tag and a </metadata1> tag, for example), logical location information is present therebetween, and therefore, the metadata is determined to be externally stored.

If it is determined in step S201 that the content of the metadata instead of logical location information is contained as the corresponding metadata and that the metadata is determined to not be externally stored (No in step S201), the process proceeds to step S202. In step S202, the index obtaining unit 224 of the computer system 110 reads the metadata relating to the read request from the index (the index data 202 in the memory 12) as usual, and the process ends at step S205.

On the other hand, if it is determined in step S201 that logical location information instead of the content of the metadata is contained as the corresponding metadata and that the metadata is determined to be externally stored (Yes in step S201), the process proceeds to step S203. In step S203, the index obtaining unit 224 of the computer system 110 reads, from the index (the index data 202 in the memory 12), logical location information that indicates a storage area to which content data of the metadata relating to the read request is written.

In step S204, the external reading unit 226 of the computer system 110 reads the content data of the metadata relating to the read request from the storage area that is outside the areas for the index in the DP of the tape medium 134 and that is indicated by the logical location information, and the process ends at step S205.

Specifically, in step S204, the computer system 110 gives the tape drive 132 the logical location information indicating the storage area in the DP of the tape medium 134 and instructs the tape drive 132 to perform reading. The computer system 110 thereafter obtains, as a response to the instruction, the content data of the metadata that is written to the storage area identified by using the logical location information from the tape drive 132 as a result of reading.

In the description given above, metadata is written to and read from the index data 202 in the memory 12. Now, a process of saving, on the tape medium 134, the index data 202 in the memory 12 which includes logical location information and a process of loading the index file on the tape medium 134 which includes logical location information to the memory 12 are described with reference to FIG. 8.

Figure 8:
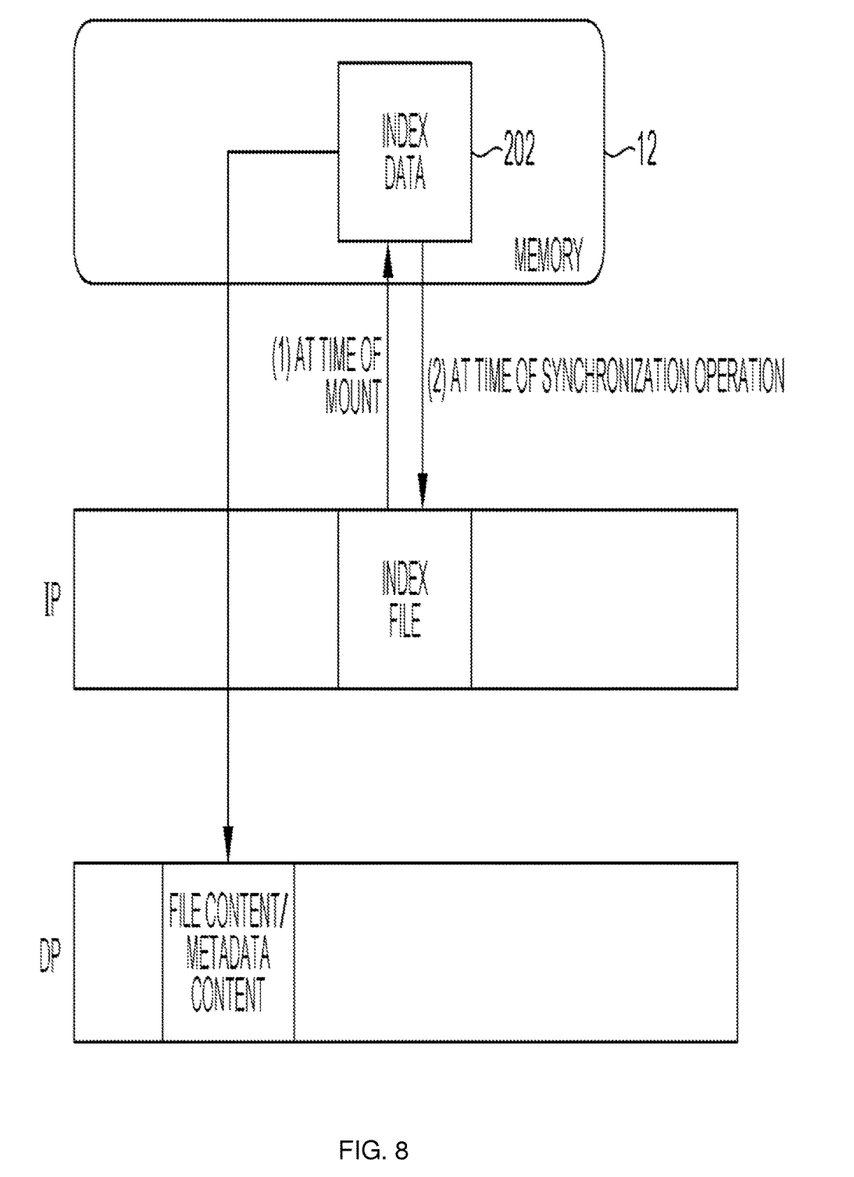
FIG. 8 is a diagram for describing a configuration for an index management unit to maintain index data in a memory according to the embodiment of the present invention.

FIG. 8 is a diagram for describing a configuration for the index management unit 230 to maintain the index data 202 in the memory 12 according to the embodiment of the present invention. As illustrated in FIG. 8, when the tape medium 134 is mounted, the computer system 110 reads the most recent version of the index file from the IP of the tape medium 134 and loads the index file to the memory 12 included in the computer system 110 as the index data 202. When a synchronization operation is performed at the time of unmount of the tape medium 134, for example, the computer system 110 overwrites the most recent version of the index in the IP of the tape medium 134 with the index data 202 in the memory 12.

In a case where a write request for writing metadata of certain data is made, the metadata is not written to the index in the IP of the tape medium 134, and logical location information about the content of the metadata in the DP of the tape medium 134 is first written to the index data 202 in the memory 12. In a case where a read request for reading metadata of certain data is made, the index in the IP of the tape medium 134 is not read, and the content of the metadata in the DP of the tape medium 134 is accessed on the basis of the index data 202 in the memory 12.

As described above, logical location information is written to the index data 202 in the memory 12 in response to a write request for writing metadata, and the index data 202 that includes the logical location information is saved on the tape medium 134 as the index file at the time of a synchronization operation. As described above, logical location information is read from the index data 202 in the memory 12 in response to a read request for reading metadata, and the index data 202 that includes the logical location information is loaded to the memory 12 when the tape medium 134 is mounted and the index file on the tape medium 134 is read.

Figure 9:
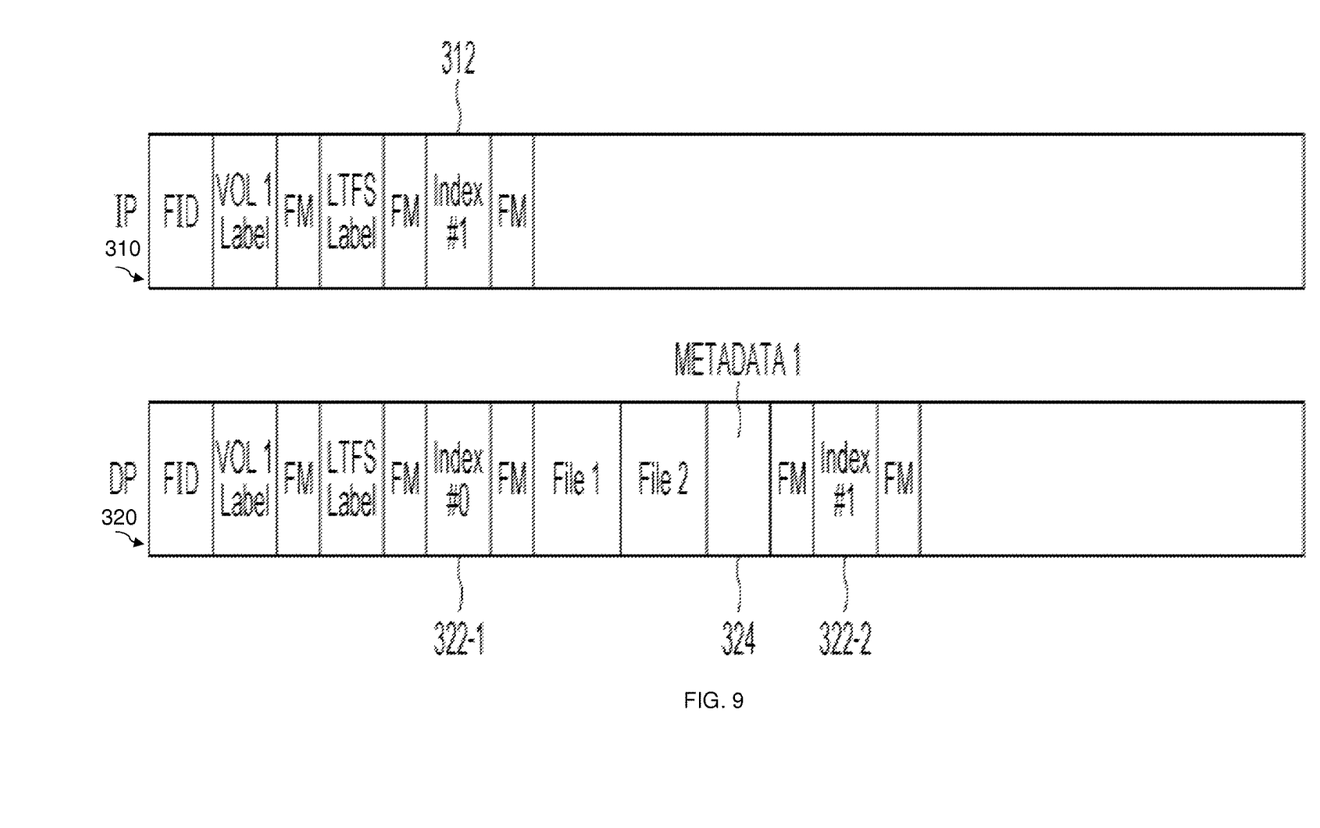
FIG. 9 is a diagram for describing an effect of a metadata storage scheme provided by the tape file management system according to the embodiment of the present invention, by illustrating a data structure.

FIG. 9 is a diagram for describing an effect of a metadata storage scheme provided by the tape file management system according to the embodiment of the present invention, by illustrating a data structure. As illustrated in FIG. 9, a volume layout configured in accordance with the embodiment includes an IP 310 in which the index that contains one or more pieces of metadata of each of one or more pieces of data is stored, and a DP 320 in which content data of each of the one or more pieces of data is stored and multiple versions of the index, namely, a previous index 322-1 and a most recent index 322-2, are additionally stored, as in the related art illustrated in FIG. 1. However, it is apparent from comparison with FIG. 1 that content data 324 of metadata having a capacity that meets a predetermined criterion is further stored in the DP 320. A most recent index 312 and the most recent index 322-2 that are written to the tape medium 134 contain logical location information indicating a storage location in the DP 320 to which content data of metadata having a capacity that meets a predetermined criterion is written, as described above.

By employing the metadata storage scheme described above, a problem that the capacity of the index becomes excessively large and the index file is unable to fit in the IP, and a problem that writing of the index file to the IP takes longer are prevented. A problem that, in a case of cumulatively storing multiple versions of the index in the DP, a large proportion of the capacity of the DP is used for metadata, resulting in a shortage of available resources of the DP, is prevented. Furthermore, regarding metadata having a large capacity, only logical location information is maintained in the index data 202 in the memory 12, and therefore, a problem that the index consumes more resources of the memory 12 is prevented. The metadata storage scheme described above is particularly useful in a case of saving metadata, such as a fork, which may have a large capacity on the tape medium 134.

Here, a case of writing 1000 files each having a file size of 1 GB to a tape medium based on LTO5 while performing a synchronization operation (sync operation) every five minutes is assumed. In this case, taking into consideration the write speed based on LTO5, it is estimated that a synchronization operation is performed 35 times in total until writing of 1000 files each having a file size of 1 GB is completed. Metadata of 29 files is included in an index in the first synchronization operation, and metadata of 29 files and metadata of 29 more files are included in a subsequent version of the index in the second synchronization operation, for example, so that the size of the index increases progressively. Taking into consideration the size of the index that increases progressively in this way, metadata of an average of 500 files is stored per index.

If it is assumed that each file has a fork of 20 MB, which is written to an index, the capacity of forks in the index is 10 GB on average (20 MB×500 files on average), and a capacity of 350 GB is consumed if writing of forks is performed 35 times.

On the other hand, by applying the metadata storage scheme according to the embodiment of the present invention described above, it is sufficient to prepare, as the capacity for forks, a capacity obtained by adding a capacity of 20 GB (20 MB×1000 files) that is allocated outside the areas for the index and a capacity for data of logical location information included in the index (logical location information itself has a very small capacity and consumes a small capacity even if written 35 times) because the content of forks is stored outside the areas for the index. In other words, it is possible to write 300 or more extra files each having a file size of 1 GB. According to a calculation of a time required for updating the index file, if the transfer rate is assumed to be 100 MB/sec., it is possible to reduce the time required for updating the index file by about one hour (=3300 [sec.]=330 [GB]/100 [MB/sec.]).

As described above, according to the embodiment of the present invention, it is possible to provide a metadata writing method, a metadata reading method, a file management system, a computer system, a program product, and a data structure, with which, in a storage medium in which an index that contains metadata of each of one or more pieces of data is stored, the index can be prevented from becoming excessively large and metadata can be stored without consuming more resources.

Note that, in the above-described embodiment, a tape medium is assumed to be a preferable example of a storage medium. The metadata storage scheme according to the embodiment of the present invention is particularly effective for a tape medium; however, as a storage medium, a medium other than a tape medium is not excluded. In other embodiments, the metadata storage scheme can be applied to any type of storage medium that is a sequential access medium.

The above-described functions of the present invention can be implemented with a program that is described using a legacy programing language, such as an assembler, C, C++, C#, or Java (registered trademark), or an object-oriented programming language and that is executable by an apparatus. The program can be stored in a recording medium that is readable by an apparatus and be distributed, or can be distributed through transmission.

Embodiments of the present invention overcome shortcomings in the related art, and an object thereof is to provide a metadata writing method, a metadata reading method, a file management system, a computer system, a program product, and a data structure with which, in a storage medium that stores an index which contains metadata of each of one or more pieces of data. Thereby, it is possible to prevent the index from becoming excessively large and to store metadata without consuming more resources.

Thereby, the embodiments according to the present disclosure provide a metadata writing method, a metadata reading method, a file management system, a computer system, and a program product for storing metadata in a storage medium.

In one or more embodiments according to the present disclosure, the metadata writing method is a method for writing metadata to a storage medium in which an index that contains metadata of each of one or more pieces of data is stored. The metadata writing method includes determining, in response to a write request for writing metadata, whether the capacity of the metadata relating to the write request meets a criterion of outside-index storage. The method writes at least a portion of the content of the metadata relating to the write request to a storage area outside the index in a case where the capacity is determined to meet the criterion of outside-index storage. The method stores, in the index, location information indicating the storage area to which the at least a portion of the content is written, the steps being performed by the computer system.

The present invention provides a metadata writing method, according to the embodiments described herein. The metadata writing method is a method for writing metadata to a storage medium in which an index that contains metadata of each of one or more pieces of data is stored. In the metadata writing method, a computer system determines, in response to a write request for writing metadata, whether the capacity of the metadata relating to the write request meets a criterion of outside-index storage. In a case where the capacity is determined to meet the criterion of outside-index storage, the computer system writes at least a portion of the content of the metadata relating to the write request to a storage area outside the index, and stores, in the index, location information indicating the storage area to which the at least a portion of the content is written.

Further, according to embodiments of the present invention, there is provided a metadata reading method for reading metadata from a storage medium in which an index is stored. In the metadata reading method, a computer system determines, in response to a read request for reading metadata, whether the metadata relating to the read request is stored outside the index. In a case where the metadata is determined to be stored outside the index, the computer system obtains, from the index, location information indicating a storage area outside the index, and reads at least a portion of the content of the metadata relating to the read request from the storage area identified by using the obtained location information.

Further, according to embodiments of the present invention, there is provided a file management system for performing, on a computer system, file management for a storage medium in which an index that contains metadata of each of one or more pieces of data is stored. The file management system includes: a storage destination determination unit that determines, in response to a write request for writing metadata, whether the capacity of the metadata relating to the write request meets a criterion of outside-index storage; a writing unit that writes at least a portion of the content of the metadata relating to the write request to a storage area outside the index in a case where the capacity is determined to meet the criterion of outside-index storage; and a storing unit that stores, in the index, location information indicating the storage area to which the at least a portion of the content is written.

Further, according to embodiments of the present invention, the file management system includes: a storage source determination unit that determines, in response to a read request for reading metadata, whether the metadata relating to the read request is stored outside the index; an obtaining unit that obtains, from the index, location information indicating a storage area outside the index in a case where the metadata is determined to be stored outside the index; and a reading unit that reads at least a portion of the content of the metadata relating to the read request from the storage area identified by using the obtained location information.

Further, according to embodiments of the present invention, there is provided a computer system including: a processor; a memory with which the processor communicates; and an interface device used to make a connection with a storage medium driving device that drives a storage medium in which an index that contains metadata of each of one or more pieces of data is stored. In the computer system, the processor is configured to determine, in response to a write request for writing metadata, whether the capacity of the metadata relating to the write request meets a criterion of outside-index storage, write at least a portion of the content of the metadata relating to the write request to a storage area outside the index in a case where the capacity is determined to meet the criterion of outside-index storage, and store, in the index, location information indicating the storage area to which the at least a portion of the content is written.

Further, according to embodiments of the present invention, in the computer system, the processor is configured to determine, in response to a read request for reading metadata, whether the metadata relating to the read request is stored outside the index, obtain, from the index, location information indicating a storage area outside the index in a case where the metadata is determined to be stored outside the index, and read at least a portion of the content of the metadata relating to the read request from the storage area identified by using the obtained location information.

Further, according to embodiments of the present invention, a program product for causing a computer system to function as the units of the file management system can be provided.

Further, according to embodiments of the present invention, a data structure including: an index partition in which an index that contains one or more pieces of metadata of each of one or more files is stored; and a data partition in which content data of each of the one or more files are stored and multiple versions of the index are additionally stored can be provided. In the data partition, content data of metadata having a capacity that meets a predetermined criterion is further stored. The index contains location information indicating a storage location in the data partition to which the content data of the metadata having the capacity that meets the predetermined criterion is written.

Advantages with the configurations and embodiments described above include, in a storage medium that stores an index which contains metadata of each of one or more pieces of data, it is possible to prevent the index from becoming excessively large and to store metadata without consuming more resources.

Note that other effects may be grasped from the detailed description of the present invention.

The present invention has been described with reference to one or more specific embodiments; however, the present invention is not limited to the embodiment(s). Alterations including other embodiments, addition, modifications, and deletion may be made within a scope that those skilled in the art can conceive, and are included in the scope of the present invention as long as the effects of the present invention are attained in any aspect.

What is claimed is:

1. A computer-implemented metadata processing method which includes writing metadata to or reading metadata from a storage medium in which an index that contains metadata of each of one or more pieces of data is stored, the method comprising:
   determining using a computer, in response to a processing request, which includes a write request or a read request, when to communicate with a storage area outside the index;
   processing at least a portion of content of the metadata relating to the processing request to or from the storage area outside the index;
   accessing, including storing or obtaining, in the index, location information indicating the storage area of the portion of content of the metadata;
   determining, in response to the write request for writing metadata, when a capacity of the metadata relating to the write request meets a criterion of outside-index storage;
   writing at least a portion of content of the metadata relating to the write request to a storage area outside the index when the capacity is determined to meet the criterion of outside-index storage; and
   storing, in the index, logical location information indicating the storage area to which the at least a portion of the content is written.

2. The metadata writing method according to claim 1, further comprising:
   storing the content of the metadata relating to the write request in the index in a case where the capacity is determined to not meet the criterion of outside-index storage.

3. The metadata writing method according to claim 1, wherein,
   the index is maintained on a storage device included in the computer system, and
   the metadata writing method further comprises overwriting an index section defined in the storage medium with a most recent version of the index.

4. The metadata writing method according to claim 3, wherein,
   the writing to a storage area outside the index includes:

instructing a storage medium driving device to write the at least a portion of the content to a data section that is defined in the storage medium separately from the index section, and obtaining, from the storage medium driving device, location information that indicates the storage area in the storage medium to which the at least a portion of the content is written.

5. The metadata writing method according to claim 4, wherein content of each of the one or more pieces of data and multiple versions of the index are additionally stored in the data section of the storage medium.

6. The metadata writing method according to claim 1, wherein the storage medium is a sequential access medium.

7. The metadata writing method according to claim 1, wherein the storage medium is a tape medium.

8. The method of claim 1, further comprising:
determining, in response to the read request for reading metadata, when the metadata relating to the read request is stored outside the index;
obtaining, from the index, location information indicating a storage area outside the index in a case where the metadata is determined to be stored outside the index; and
reading at least a portion of content of the metadata relating to the read request from the storage area identified by using the obtained location information.

9. The method according to claim 8, further comprising:
obtaining, from the index, the content of the metadata relating to the read request in a case where the metadata is determined to not be stored outside the index.

10. The method according to claim 8, further comprising:
reading a most recent version of the index from an index section defined in the storage medium, and maintaining the most recent version of the index on a storage device included in the computer system.

11. The metadata reading method according to claim 10, wherein,
the reading at least a portion of content of the metadata relating to the read request includes:
instructing a storage medium driving device to perform reading by giving location information indicating the storage area in a data section that is defined in the storage medium separately from the index section, and
obtaining a result of reading the at least a portion of the content from the storage medium driving device.

12. The metadata reading method according to claim 8, wherein,
the metadata stored outside the index is written to a data section of the storage medium because a capacity of the metadata meets a criterion of outside-index storage, and
content of each of the one or more pieces of data and multiple versions of the index are additional stored in the data section of the storage medium.

13. A file management system for performing, on a computer system, file management for a storage medium in which an index that contains metadata of each of one or more pieces of data is stored, the file management system comprising:
a storage determination unit that determines, in response to a processing request, which includes a write request or a read request, when to communicate with a storage area outside the index;
a processing unit, including a writing unit or an obtaining unit, that processes at least a portion of content of the metadata relating to the processing request to or from the storage area outside the index;
an accessing unit, including a storing unit or a reading unit, that stores or reads, in the index, location information indicating the storage area of the portion of content of the metadata;
a storage destination determination unit that determines, in response to the write request for writing metadata, when a capacity of the metadata relating to the write request meets a criterion of outside-index storage;
the writing unit writes at least a portion of content of the metadata relating to the write request to a storage area outside the index when the capacity is determined to meet the criterion of outside-index storage; and
the storing unit stores, in the index, location information indicating the storage area to which the at least a portion of the content is written.

14. The file management system of claim 13, the file management system comprising:
a storage source determination unit that determines, in response to the read request for reading metadata, whether the metadata relating to the read request is stored outside the index;
the obtaining unit obtains, from the index, location information indicating a storage area outside the index in a case where the metadata is determined to be stored outside the index; and
the reading unit reads at least a portion of content of the metadata relating to the read request from the storage area identified by using the obtained location information.

15. A computer system comprising:
a processor;
a memory with which the processor communicates; and
an interface device used to make a connection with a storage medium driving device that drives a storage medium in which an index that contains metadata of each of one or more pieces of data is stored, wherein
the processor being configured to:
determine, in response to a processing request, which includes a write request or a read request, when to communicate with a storage area outside the index;
process at least a portion of content of the metadata relating to the processing request to or from the storage area outside the index;
access, including storing or obtaining, in the index, location information indicating the storage area of the portion of content of the metadata;
wherein the processor is further configured to:
determine, in response to the write request for writing metadata, whether a capacity of the metadata relating to the write request meets a criterion of outside-index storage;
write at least a portion of content of the metadata relating to the write request to a storage area outside the index in a case where the capacity is determined to meet the criterion of outside-index storage; and
store, in the index, location information indicating the storage area to which the at least a portion of the content is written.

16. The computer system of claim 15, wherein the processor is further configured to:
determine, in response to the read request for reading metadata, whether the metadata relating to the read request is stored outside the index;

obtain, from the index, location information indicating the storage area outside the index in a case where the metadata is determined to be stored outside the index; and read at least a portion of content of the metadata relating to the read request from the storage area identified by using the obtained location information.

\* \* \* \* \*